United States Patent
Sakamoto et al.

[11] Patent Number: 5,992,555
[45] Date of Patent: Nov. 30, 1999

[54] POWER TRAIN SUPPORTING APPARATUS

[75] Inventors: Sunao Sakamoto; Souichiro Okudaira, both of Toyota; Yoshio Shirai, Okazaki, all of Japan

[73] Assignee: Toyota Jidosha Kabushiki Kaisha, Toyota, Japan

[21] Appl. No.: 08/760,838

[22] Filed: Dec. 5, 1996

[30] Foreign Application Priority Data

Dec. 5, 1995 [JP] Japan ................................. 7-316793

[51] Int. Cl.⁶ .................................................... B60K 5/00
[52] U.S. Cl. ............................................................ 180/232
[58] Field of Search .................................... 180/300, 299, 180/232, 312, 297

[56] References Cited

U.S. PATENT DOCUMENTS

| 3,774,712 | 11/1973 | Froumajou | 180/232 |
| 4,181,192 | 1/1980 | Danckert | 180/274 |

FOREIGN PATENT DOCUMENTS

| 2120386 | 8/1972 | France . | |
| 21 52 136 | 4/1973 | Germany | 180/232 |
| 4326396A1 | 2/1995 | Germany . | |
| 4372425 | 12/1992 | Japan . | |
| 5338445 | 12/1993 | Japan . | |

OTHER PUBLICATIONS

German Literature: Triebwerklagerungssystem Frontantrieb mit Quermotor (engine mount system front wheel with transverse engine), 1988, Lecture "Demant" Opel.

*Primary Examiner*—Robert J. Oberleitner
*Assistant Examiner*—Faye M. Fleming
*Attorney, Agent, or Firm*—Kenyon & Kenyon

[57] ABSTRACT

An apparatus for supporting a power train in a vehicle body having a monocoque structure that includes a bumper reinforcer, which is arranged in front of a passenger compartment, side members, and a toe board. The supporting apparatus is provided with first and second push rods, and a torque rod for supporting the power train. The first and second push rods are connected to the bumper reinforcer and support the front side of the power train. During a head-on collision, the first and second push rods cause the power train to be displaced toward the passenger compartment in a downwardly inclined direction. In the same manner, the torque rod is connected to the toe board and supports the rear side of the power train. During the head-on collision, the torque rod also causes the power train to be displaced toward the passenger compartment in a downwardly inclined direction.

15 Claims, 4 Drawing Sheets

POWER TRAIN SUPPORTING APPARATUS

BACKGROUND OF THE INVENTION

1. Field of the Invention

The present invention relates to an apparatus for supporting a power train in a vehicle's engine room. More particularly, the present invention pertains to a power train supporting apparatus that supports the power train so as to suppress the deformation of a partition separating a vehicle's engine room from a passenger compartment during a head-on collision.

2. Description of the Related Art

Monocoque structures, in which a chassis frame and a body of a vehicle are integral, are widely employed in automobiles. A power train, which includes an engine and a transmission, is accommodated in an engine room. A passenger compartment is located at the rear of the engine room. The engine room is defined between a pair of side members, a front cross member, which connects the front ends of the side members, and a toe board, which connects the rear ends of the side members. The toe board separates the engine room from the passenger compartment.

The energy of a head-on collision causes a rearward contraction of the engine room (including the side members). The energy produced during the collision deforms the side members, among other things, and is thus absorbed by the deformation of these parts. Accordingly, the energy that is transmitted to the power train is reduced. This suppreses the rearward displacement of the power train and prevents contact with the toe board. As a result, the deformation of the board is prevented. To efficiently absorb the impact of the collision in this manner, research related with the cross-sectional shape of the side members and other associated members has been conducted.

There are cases in which it is desirable for an automobile's hood to be located at a relatively low position. Therefore, there are types of automobiles having a power train, the upper part of which is inclined toward the passenger compartment. This structure brings the upper part of the power train closer to the toe board. As a result, the power train is more apt to contact the toe board during head-on collisions than in structures in which the power train is oriented in an upright or vertical manner. Such contact can cause deformation of the toe board.

Japanese Unexamined Patent Publication No. 5-338445 describes an apparatus to cope with the above problem. As shown in FIG. 6, a supporting apparatus 100 includes side members (not shown), one of which is located on each side of a power plant (power train) 102, a front cross member 104 connecting the front ends of the side members, a front center member 103 supporting the power train 102, and a toe board 107 defining an engine room 106 and a passenger's room 101.

The center member 103 has a first holder 108 located near its front end and a second holder 109 located near its rear end. The power train 102 has first and second brackets 110, 111 located at positions corresponding to the first and second holders 108, 109, respectively. The first bracket 110 is rotatably connected to the first holder 108 by a bolt 112. The second bracket 111 includes a guide hole 113 extending diagonally upward toward the right, as viewed in the drawing. A bolt 114 is inserted into the hole 113 to connect the second bracket 111 to the second holder 109. The hole 113 enables the second bracket 111 to move with respect to the second holder 109.

When the automobile collides head-on, the energy of the collision applied from the front (the left in FIG. 6) crushes the side members and the center member 103, axially. The first holder 108 and the first bracket 110 enable the power train 102 to be rotated while also pushing the lower portion of the power train 102 toward the rear. This causes the power train 102 to be displaced in an upwardly inclined direction. The movement of the power train 102 is guided by the hole 113. In this manner, the entire power train 102 is rotated about its center of gravity in a counterclockwise direction, as viewed in the drawing. Consequently, the power train 102 is positioned upright with its upper section separated from the toe board 107.

This structure reduces the likelihood that the power train 102 will contact the board 107 during head-on collisions despite the upper section of the power train being inclined toward the passenger compartment 101. Accordingly, the apparatus 100 reduces the likelihood that the power train 102 will damage the toe board 107.

However, while the apparatus 100 enables the power train 102 to be positioned upright, excessive colliding energy increases the rearward movement of the power train 102. This may cause the power train 102 to contact and deform the toe board 107.

As when using a supporting apparatus that holds a power plant upright, the timing of when the power train 102 contacts the toe board 107 is determined by the length of the side members and the center members 103. Thus, the deformation of the toe board 107 that is caused by the power train 102 is affected by the length of the section between the nose of the automobile and the toe board 107, or the crush zone. The length of deformation in the colliding direction, or the crush stroke, is long in automobiles having a long crush zone. Accordingly, the toe board is more likely to be deformed in automobiles having a short crush zone during collisions than in automobiles having a long crush zone.

Smaller automobiles are advantageous from the viewpoint of energy consumption and environmental problems. Thus, the number of compact automobiles has increased during recent years. Accordingly, it is desirable that compact automobiles have the same energy absorbing performance as large-size automobiles. However, the employment of the prior art power train supporting apparatus in compact-size and middle-size automobiles results in an impact absorbing capability that is lower than that of large-size automobiles.

SUMMARY OF THE INVENTION

Accordingly, it is a primary objective of the present invention to provide a power train supporting apparatus that allows for additional energy absorption in the engine room during a collision despite the size of the vehicle.

It is another objective of the present invention to provide a power train supporting apparatus that delays the timing of contact between the power train and a partition separating the engine room from the passenger compartment.

For achieving the above objectives, a power train supporting apparatus is provided. The vehicle has a frame and a passenger compartment, wherein the apparatus is located closer to a vehicle's front end than the passenger compartment, and wherein said frame includes a front portion, side portions and a rear portion. The apparatus has a first support for connecting the power train to the front portion, said first support being arranged to move the power train downward and rearward based in response to a collision at the vehicle's front end and a second support for connecting the power train to the rear portion, said second support being arranged to move the power train downward and rearward in response to the collision.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
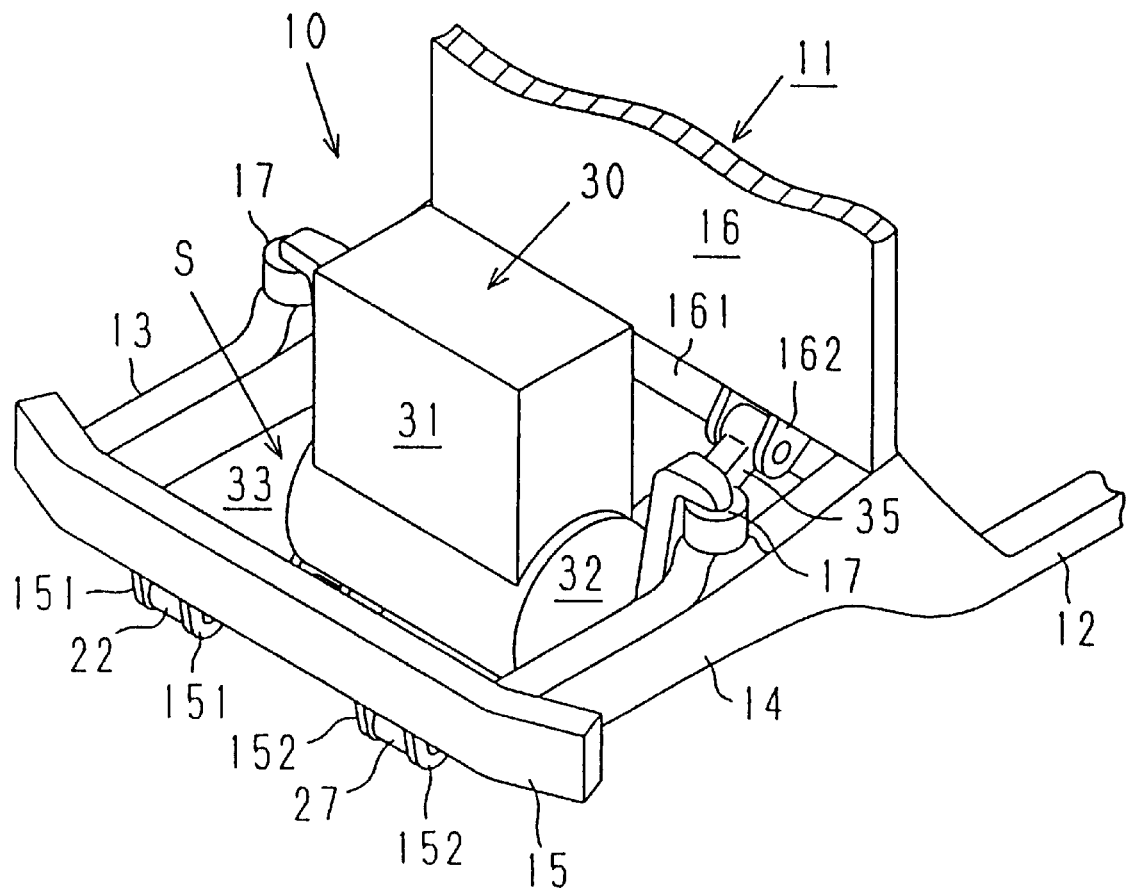
FIG. 1 is a perspective view showing the power train supporting apparatus according to the present invention that is employed in the front section of an automobile.

A power train supporting apparatus according to the present invention will hereafter be described with reference to FIGS. 1–5.

The present invention is applied to an automobile having a monocoque structure. Thus, the frame is integral with the vehicle body. However, only the frame, which serves as a skeletal member, is diagrammatically shown in the drawings to facilitate understanding. Terms referring to directions such as front, rear, left, and right will be based on the passenger's view when describing the supporting apparatus 10.

As shown in FIG. 1, left and right floor side members 12 are arranged at the bottom of a passenger compartment 11. A front side member 13 is located frontward of the right floor side member 12 while a front side member 14 is located frontward of the left floor side member 12. The front ends of both front side members 13, 14 are connected to each other by a bumper reinforcer 15. The reinforcer 15 reinforces the front ends of the side members 13, 14. The rear ends of the side members 13, 14 are connected to each other by a toe board 16. A space S, in which a power train 30 is accommodated, is defined between the side members 13, 14, the bumper reinforcer 15, and the toe board 16. An engine room 33 is defined within the space S above the side members 13, 14 and the bumper reinforcer 15. The power train 30 includes an engine 31 and a transmission 32. The passenger compartment 11 is located at the rear side of the engine room 33. The toe board 16 separates the engine room 33 and the passenger compartment 11.

Figure 2:
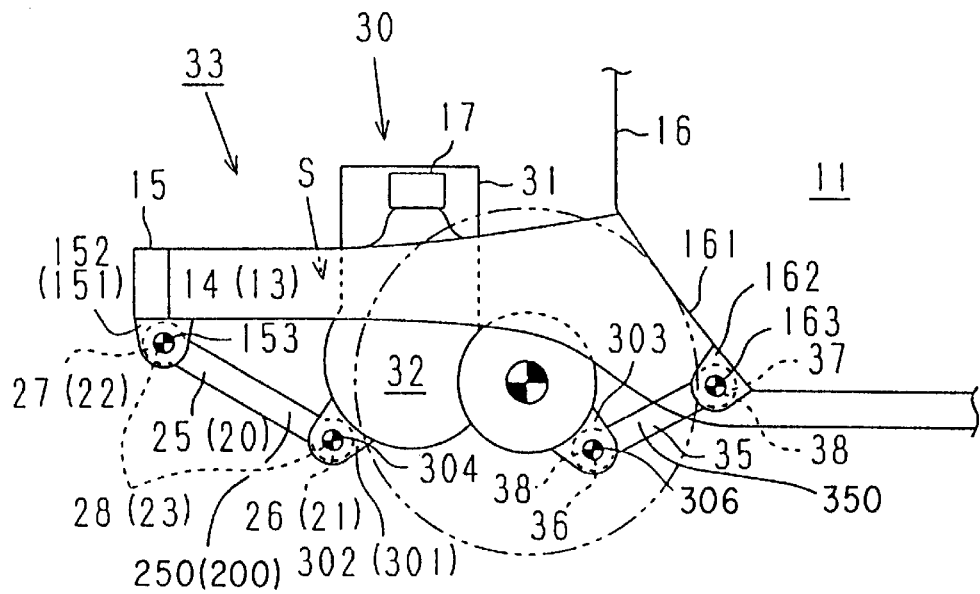
FIG. 2 is a side view showing the power train supporting apparatus.
Figure 3:
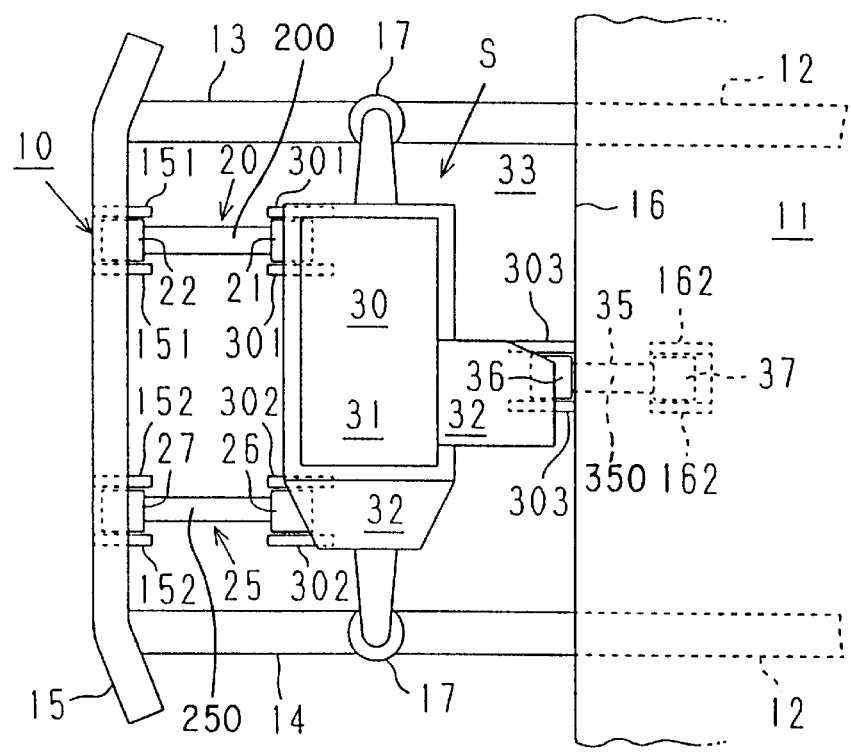
FIG. 3 is a plan view showing the power train supporting apparatus.

As shown in FIGS. 2 and 3, the power train 30 is rotatably connected to the bumper reinforcer 15 by first and second push rods 20, 25 having shaft portions 200 and 250, respectively. The power train 30 is also rotatably connected to the toe board 16 by a torque rod 35 having a shaft portion 350. Furthermore, the power train 30 is engaged with each side member 13, 14 by holders 17, which absorb the vibrations at the left and right sides of the power train 30.

First and third joints 21, 22 are defined on the front and rear ends of the first push rod 20. The first joint 21 is pivotally connected to the power train 30 while the third joint 22 is pivotally connected to the bumper reinforcer 15. In the same manner, second and fourth joints 26, 27 are defined on the front and rear ends of the second push rod 25. The second joint 26 is pivotally connected to the power train 30 while the fourth joint 27 is pivotally connected to the bumper reinforcer 15. Each of the first and third joints 21, 22 has a connecting hole 23, in which a pin (not shown) is inserted. In the same manner, each of the second and fourth joints 26, 27 has a connecting hole 28, in which a pin (not shown) is inserted.

Fifth and sixth joints 36, 37 are defined on the front and rear ends of the torque rod 35. The fifth joint 36 is pivotally connected to the power train 30 while the sixth joint 37 is pivotally connected to the toe board 16. Each of the fifth and sixth joints 36, 37 has a connecting hole 38, in which a pin (not shown) is inserted.

The bumper reinforcer 15 is provided with a pair of first brackets 151, which are connected with the third joint 22, and a pair of second brackets 152, which are connected with the fourth joint 27. Each of the brackets 151, 152 has a connecting hole 153, in which a pin (not shown) is inserted.

An oblique surface 161, which is inclined with respect to the horizontal plane, is defined on the toe board 16. A pair of third brackets 162 are arranged at the bottom of the inclined surface 161. Each of the brackets 162 has a connecting hole 163, in which a pin (not shown) is inserted.

A pair of fourth brackets 301 and a pair of fifth brackets 302 are provided on the front end of the power train 30. The fourth brackets 301 are connected to the first joint 21 while the fifth brackets 302 are connected to the second joint 26. Each of the brackets 301, 302 has a connecting hole 304, in which a pin (not shown) is inserted. As shown in FIG. 2, the fourth and fifth brackets 301, 302 are located at positions lower than the first and second brackets 151, 152. Accordingly, the first push rod 20, which is connected to the first and fourth brackets 151, 301, extends diagonally downward to the rear. In the same manner, the second push rod 25, which is connected to the second and fifth brackets 152, 302, extends diagonally downward to the rear.

A pair of sixth brackets 303, which are connected to the fifth joint 36, is provided on the rear end of the middle portion of the power train 30. Each of the brackets 303 has a connecting hole 306, in which a pin (not shown) is inserted. The sixth brackets 303 are located at positions lower than the third brackets 162. Accordingly, the torque rod 35, which is connected to the third and sixth brackets 162, 303 extends diagonally upward to the rear.

The displacement of the power train during a collision of the vehicle will now be described with reference to FIG. 4. When the vehicle collides head-on against other vehicles, or the like, impact is first applied to the bumper reinforcer 15. This applies a horizontal load to the bumper reinforcer 15. The load is then separated and transmitted to the side members 13, 14 in their axial directions, and to the first and second push rods 20, 25 in a rearwardly inclined direction.

The load transmitted to the side members 13, 14 compresses, or crushes, the side members 13, 14 in a rearward direction. The load transmitted to the first and second push rods 20, 25 applies a rearwardly inclined load to the power train 30.

The collision further crushes the side members 13, 14 and moves the third joint 22 of the first push rod 20 and the fourth joint 27 of the second push rod 25 toward the toe board 16. Although, the third and fourth joints 22, 24 and the first and second brackets 151, 152 are displaced horizontally by the collision, their vertical positions remain unchanged.

Figure 4:
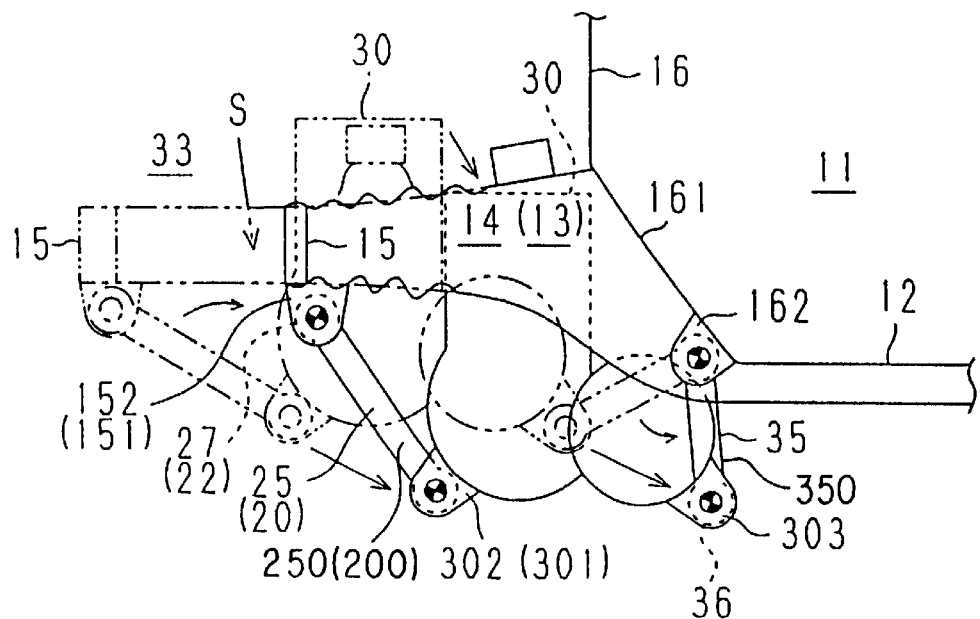
FIG. 4 is an explanatory diagram showing the deformation of the power train supporting apparatus during a collision.

Accordingly, the crushing of the front side members 13, 14 rotates the push rods 20, 25 about the associated first and second brackets 151, 152 in a clockwise direction, as viewed in FIG. 4. As a result, the first and second joints 21, 26 of the associated push rods 20, 25 are displaced downward. This, in turn, displaces the power train 30 in a downwardly inclined direction.

As for the torque rod 35, although the position of the third brackets 162 of the toe board 16 is fixed, the sixth brackets 303 may be displaced in both horizontal and vertical directions. Accordingly, the downwardly inclined movement of the power train 30 rotates the torque rod 35 about the brackets 162 in a counterclockwise direction, as viewed in FIG. 4.

Accordingly, the position of the fifth joint 36, with respect to the ground surface, becomes lower than before the collision. This causes the position of the rear portion of the power train 30 to be moved downward in the same manner as the front portion of the power train 30.

As described above, the rotation of the first and second push rods 20, 25 and the torque rod 35 not only allows the power train 30 to be displaced rearwardly but also displaces the power train 30 downward as it moves toward the toe board 16. The power train 30 is moved out of the engine room 33 by the downward displacement. This allows the space occupied by the power train 30 to be used for energy absorption during a collision. This relatively increases the length of deformation in the colliding direction, or the crush stroke, of the side members 13, 14. Accordingly, the load is efficiently absorbed by the side members 13, 14 and the power train 30 is directed away from the toe board 16.

In case the upper part of the power train 30 ultimately contacts the inclined surface 161 of the toe board 16, the time of contact between the power train 30 and the toe board 16 is delayed in comparison to a structure in which the power train 30 is moved in a rearward linear direction. Accordingly, the delayed contact between the power train 30 and the toe board 16 minimizes the load applied to the board 16 during a collision and drastically reduces the damage to the board 16 caused by the movement of the power train 30.

The first and second push rods 20, 25 are each connected to the bumper reinforcer 15, which is the first to receive impact during a collision. Hence, during the initial period of the collision, the bumper reinforcer 15 applies a downwardly inclined load to the first and second push rods 20, 25. As a result, this structure ensures the downwardly inclined movement of the power train 30 as it approaches the toe board 16 even in compact automobiles in which the crush zone is short.

Figure 5:
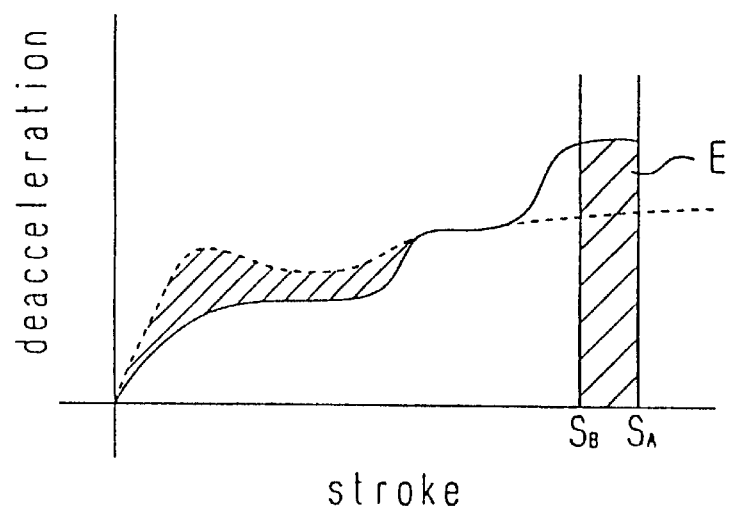
FIG. 5 is a graph showing the relationship between the deceleration of the automobile and the stroke of the side members.
Figure 6:
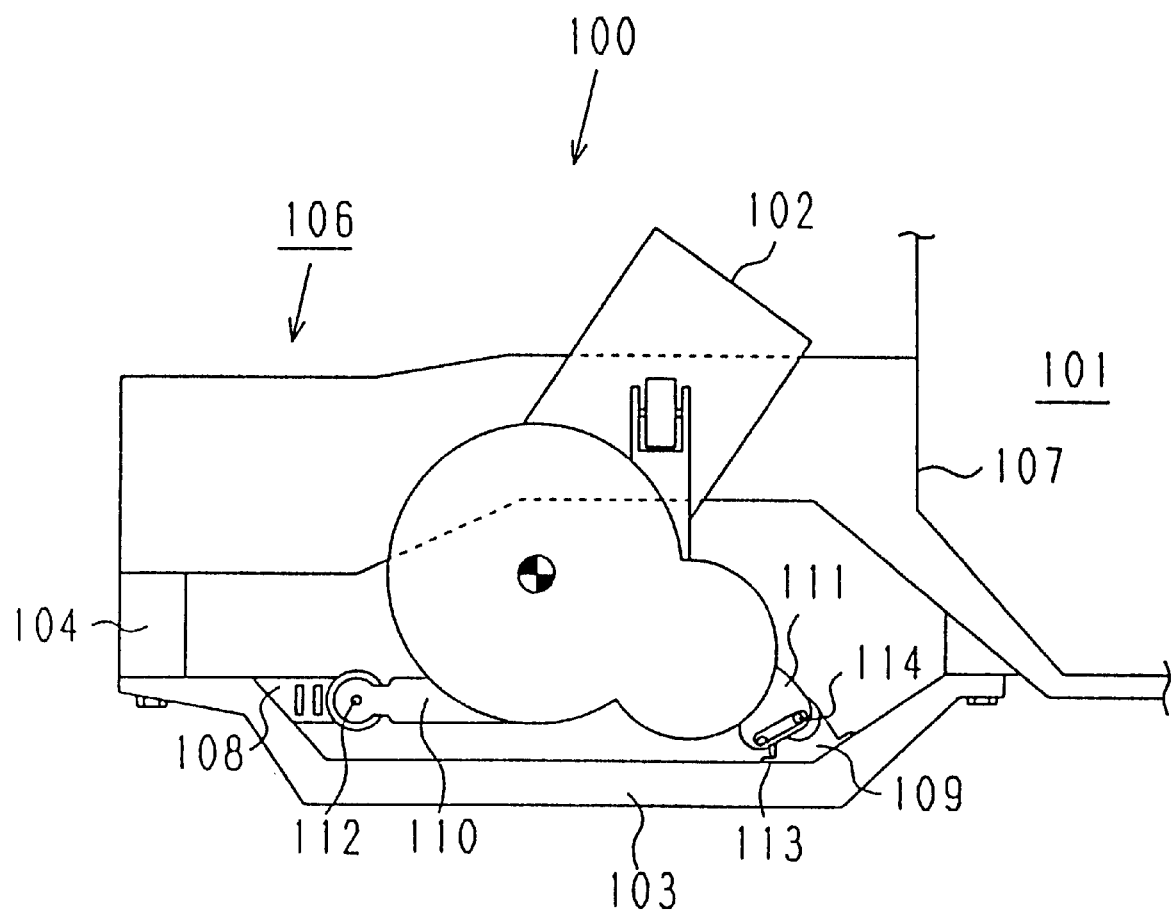
FIG. 6 is a side view showing the prior art power train supporting apparatus.

FIG. 5 shows a graph illustrating the relationship between deceleration of the vehicle after collision and the stroke (crushed length) of the front side members 13, 14. The vertical axis expresses the deceleration of the automobile while the horizontal axis expresses the stroke. The solid line shows the alteration of the level of deceleration when employing a prior art power train supporting apparatus while the broken line shows the alteration of the deceleration when employing the power train supporting apparatus 10 according to the present invention.

In the prior art supporting apparatus, the power train is arranged upright in the engine room and is allowed to move only in a horizontal direction during a collision.

As shown by the graph, in the prior art apparatus the level of deceleration changes in a step-like manner. The impact crushes the side members, the maximum stroke of which is indicated by $S_B$. When the bumper reinforcer impacts the power train, the level of deceleration increases suddenly. As the crushed length of the side members increases and causes the power train to crash into the toe board, the level of deceleration further increases. Thus, the maximum level of deceleration becomes extremely high. The high level of deceleration may indicate substantial damage to the toe board.

In comparison, in the apparatus 10 according to the present invention, the first and second push rods 20, 25 receive a large level of load during the initial period of the collision. Thus, the level of deceleration during the initial period of the collision, which is shown by the broken line, is greater than that exhibited by the prior art apparatus. Furthermore, since the power train 30 is moved in a downwardly inclined direction, the maximum stroke (crushable length) of the front side members 13, 14 is substantially lengthened to $S_A$. Accordingly, the impact is more efficiently absorbed by the side members.

As described above, the bumper reinforcer 15 does not impact into the power train 30 and thus the power train 30 does not crash into the toe board 16. Thus, the level of deceleration is substantially the same throughout the stroke and the maximum level of deceleration is reduced to a lower level than in the prior art apparatus.

The support apparatus 10 results in rapid deceleration and absorbs the energy during the initial period of the collision. The amount of energy absorbed during the initial period is equivalent to the amount of colliding energy E absorbed in the latter period of the collision in the prior art apparatus.

In automobiles employing an emergency locking retractor (EMR) type seat belts, which lock the seat belt when the level of the drawing acceleration of the belt becomes high, the belt is securely locked by the higher level of deceleration during the initial period of collision.

Although only one embodiment of the present invention has been described herein, it should be apparent to those skilled in the art that the present invention may be embodied in many other specific forms without departing from the spirit or scope of the invention. Particularly, it should be understood that the present invention may be embodied in the following forms.

In the above embodiment, the third and fourth joints 22, 27 are connected to the bumper reinforcer 15, which is located at a position corresponding to the front end of the front side members 13, 14. However, in automobiles, having a different crush zone, the joints 22, 27 may be connected to a member arranged at other positions in correspondence with the length of the crush zone. This is possible since the colliding energy absorbed by the axial crushing of the side members is affected by the length of the crush zone.

Furthermore, although the supporting apparatus 10 according to the above embodiment employs a single torque rod 35, two or more torque rods may be employed. Additionally, although the apparatus 10 employs two push rods 20, 25, three or more push rods may be employed. As another option, the supporting apparatus 10 may be provided with only one push rod.

Therefore, the present examples and embodiments are to be considered as illustrative and not restrictive and the invention is not to be limited to the details given herein, but may be modified within the scope of the appended claims.

What is claimed is:

1. An apparatus for supporting a power train on a vehicle, wherein the vehicle has a frame and a passenger compartment, wherein the apparatus is located closer to a vehicle's front end than the passenger compartment, and wherein said frame includes a front portion, side portions and a rear portion, said apparatus comprising:

a first support for connecting the power train to the front portion, said first support located in front of said power train and being arranged to move the power train downward and rearward in response to a collision at the vehicle's front end; and a second support for connecting the power train to the rear portion, said second support being arranged to move the power train downward and rearward in response to the collision.

2. The apparatus as set forth in claim 1, wherein said first support has:

a shaft portion having a first end and a second end;

a first joint and a second joint respectively provided at the first end and the second end;

said first joint being rotatably coupled to the front portion at a first location; and said second joint being rotatably coupled to the power train at a second location lower than the first location.

3. The apparatus as set forth in claim 2, wherein said second support has:

a shaft portion having a third end and a fourth end;

a third joint and a fourth joint respectively provided at the third end and the fourth end;

said third joint being rotatably coupled to the rear portion at a third location; and said fourth joint being rotatably coupled to the power train at a fourth location lower than the third location.

4. The apparatus as set forth in claim 1, wherein each of said side portions has an end connected to the front portion.

5. The apparatus as set forth in claim 1 further comprising an auxiliary first support for connecting the power train to the front portion, said auxiliary first support being arranged to move the power train downward and rearward in response to the collision.

6. The apparatus as set forth in claim 1, wherein said first support, said second support and said power train form a linkage mechanism.

7. The apparatus as set forth in claim 3, wherein the force of the collision rotates the shaft portion of said second support toward about the third joint, and the third joint is kept at a constant height with respect to the ground.

8. The apparatus as set forth in claim 3, wherein said shaft portion of said first support is longer than the shaft portion of said second support.

9. The apparatus as set forth in claim 8, wherein said second joint and said fourth joint are substantially at the same height with respect to the ground, and wherein said first joint is heiger than the third joint with respect to the ground.

10. An apparatus for supporting a power train on a vehicle, wherein the vehicle has a frame and a passenger compartment, wherein the apparatus is located closer to a vehicle's front end than the passenger compartment, and wherein said frame includes a front portion, side portions and a rear portion, said apparatus comprising:

a first shaft having a first end and a second end;

a first joint and a second joint respectively provided at the first end and the second end;

said first joint being rotatably coupled to the front portion at a first location and said second joint being rotatably coupled to the power train at a second location lower than the first location, wherein said first shaft connects the power train to the front portion and is located in front of said power train;

a second shaft having a third end and a fourth end;

a third joint and a fourth joint respectively provided at the third end and the fourth end;

said third joint being rotatably coupled to the rear portion at a third location;

said fourth joint being rotatably coupled to the power train at a fourth location lower than the third location; and wherein each of said side portions has an end connected to the front portion.

11. The apparatus as set forth in claim 10 further comprising an auxiliary first support for connecting the power train to the front portion, said auxiliary first support being arranged to move the power train downward and rearward in response to a collision at the vehicle's front end.

12. The apparatus as set forth in claim 10, wherein said first shaft, said second shaft and said power train form a linkage mechanism.

13. The apparatus as set forth in claim 10, wherein the of the collision rotates the second shaft about the third joint, and the third joint is kept at a constant height with respect to the ground.

14. The apparatus as set forth in claim 10, wherein said first shaft is longer than the second shaft.

15. The apparatus as set forth in claim 14, wherein said second joint and said fourth joint are substantially at the same height with respect to the ground, and wherein said first joint is heigher than the third joint with respect to the ground.

* * * * *